United States Patent [19]
Soliman

[11] Patent Number: 5,675,581
[45] Date of Patent: Oct. 7, 1997

[54] SIMULATING USER INTERFERENCE IN A SPREAD SPECTRUM COMMUNICATION NETWORK

[75] Inventor: Samir S. Soliman, San Diego, Calif.

[73] Assignee: Qualcomm Incorporated, San Diego, Calif.

[21] Appl. No.: 601,491

[22] Filed: Feb. 14, 1996

Related U.S. Application Data

[63] Continuation of Ser. No. 274,611, Jul. 13, 1994, abandoned.
[51] Int. Cl.$^6$ ............................................... H04J 13/02
[52] U.S. Cl. .......................... 370/252; 370/335; 375/200; 455/67.3
[58] Field of Search ........................ 370/13, 17, 18, 370/252, 320, 335, 342, 479; 375/200–210; 380/34; 455/1, 33.1, 53.1, 54.1, 67.1, 67.3, 67.4, 115

[56] References Cited

U.S. PATENT DOCUMENTS

| | | | |
|---|---|---|---|
| 3,806,809 | 4/1974 | Firman | 455/115 |
| 4,317,214 | 2/1982 | Attinello | 455/1 |
| 5,220,680 | 6/1993 | Lee | 455/1 X |
| 5,233,628 | 8/1993 | Rappaport et al. | 375/224 |
| 5,596,570 | 1/1997 | Soliman | 370/252 |

*Primary Examiner*—Melvin Marcelo
*Attorney, Agent, or Firm*—Russell B. Miller; Gregory D. Ogrod

[57] ABSTRACT

A method and apparatus for simulating signal interference within a communication system, such wireless or cellular communication systems. The communication system is preferably of a type in which code division multiple access (CDMA) spread spectrum communication signals are used. The method for simulating signal interference power received by a base station receiver includes estimating a first composite signal power corresponding to the sum of signal power transmitted by a first set of simulated users located in a first cell. An estimate is also made of a first normalized date rate for transmission of the composite signal. A first interference signal is then generated at a power level determined on the basis of the first composite signal power and normalized data rate. In a preferred implementation, the first interference signal power is adjusted in accordance with an average power fluctuation arising as a consequence of closed loop power control. Further, a second composite signal power is determined by estimating the sum of signal power transmitted by a second set of simulated users located outside of the first cell. A similar estimate is made of a second normalized data rate at which this signal power is transmitted by the second set of simulated users. This allows the generation of a second interference signal based on the second composite signal power and normalized data rate. Generation of the first interference signal will typically involve synthesis of electrical noise over a predetermined frequency band. The power of the electrical noise is then adjusted in accordance with the product of the first composite signal power and the first normalized data rate.

50 Claims, 7 Drawing Sheets

SIMULATING USER INTERFERENCE IN A SPREAD SPECTRUM COMMUNICATION NETWORK

This is a continuation of application Ser. No. 08/274,611, filed Jul. 13, 1994 now abandoned.

BACKGROUND OF THE INVENTION

I. Field of the Invention

This invention relates generally to wireless communication networks such as, for example, cellular wireless local telephone systems and personal communication systems. More specifically, this invention relates to a novel and improved system and method for communicating information, in mobile cellular or satellite telephone systems, using spread spectrum type communication signals.

II. Description of the Related Art

The use of code division multiple access (CDMA) modulation techniques is one of several methods for facilitating communications in systems accommodating a large number of users. Other multiple access communication system techniques, such as time division multiple access (TDMA), frequency division multiple access (FDMA) and AM modulation schemes such as amplitude companded single sideband are known in the art. However, CDMA spread spectrum modulation techniques have significant advantages over other modulation techniques for multiple access communication systems. The use of CDMA techniques in a multiple access communication system is disclosed in U.S. Pat. No. 4,901,307, which issued Feb. 13, 1990, entitled "SPREAD SPECTRUM MULTIPLE ACCESS COMMUNICATION SYSTEM USING SATELLITE OR TERRESTRIAL REPEATERS", and is assigned to the assignee of the present invention.

In U.S. Pat. No. 4,901,307, referred to above, a multiple access technique is disclosed where a large number of wireless system users each having a transceiver communicate through satellite repeaters or terrestrial base station transceivers using CDMA spread spectrum communication signals. In using CDMA communications techniques, the frequency spectrum can be reused multiple times thus permitting an increase in system user capacity. The use of CDMA techniques results in a much higher spectral efficiency than can be achieved using other multiple access techniques.

The CDMA techniques as disclosed in U.S. Pat. No. 4,901,307 contemplated the use of relatively long high speed pseudonoise (PN) sequences with each user channel being assigned a different PN sequence. The cross-correlation between different PN sequences and the autocorrelation of a PN sequence for all time shifts other than zero both have average values dose to zero, thus allowing different user signals to be discriminated between upon reception.

However, because such PN signals are not orthogonal, mutual interference noise is created between them. This interference noise arises despite the fact that the cross-correlations of the PN signals average to near zero, since for a short time interval such as an information bit length or period the cross-correlation follows a binomial distribution. As such, the user signals interfere with each other much the same as if they were wide bandwidth Gaussian noise at the same power spectral density. Accordingly, mutual interference noise arising from non-orthogonal user signals tends to limit achievable system capacity.

In U.S. Pat. No. 5,103,459, which issued Apr. 7, 1992, entitled "SYSTEM AND METHOD FOR GENERATING SIGNAL WAVEFORMS IN A CDMA CELLULAR TELEPHONE SYSTEM", also assigned to the assignee of this invention, and which is incorporated herein by reference, there is disclosed a novel and improved method and system for constructing PN sequences that provide orthogonality between the users so that mutual interference will be reduced. Such a reduction in mutual interference allows for higher system capacity and better link performance. Since using orthogonal PN codes makes the cross-correlation zero over a predetermined time interval, no mutual interference arises, provided that the code time frames are aligned with each other.

In the system described in the patent just mentioned, a preferred waveform implemented involves using a direct sequence PN spread spectrum carrier. The chip rate of the PN carrier was chosen to be 1.2288 MHz in the preferred embodiment. One consideration involved in choosing a chip rate is that it should be exactly divisible by the baseband data rates to be used in the system. It is also desirable for the chip rate to be a power of two times the baseband data rates. In the preferred embodiment, the baseband data rate is 9600 bits per second, leading to a choice of 1.2288 MHz, which is 128 ($2^7$) times 9600 for the PN chip rate.

In communications between cellular base stations and various mobile units, the code sequences used for spreading the spectrum are constructed from two different types of sequences, each with different properties to provide different functions. There is an outer code that is shared by all signals in a cell or sector that is used to discriminate between multipath signals. The outer code is also used to discriminate between signals transmitted by different cells or sectors to the mobile units. There is also an inner code that is used to discriminate between user signals transmitted within a single sector or cell.

Implementation of a cellular CDMA system capable of providing adequate service to a particular geographic region generally involves consideration of a number of factors bearing upon system performance. For example, it is generally necessary to consider the extent of the available frequency spectrum, as well as the potential for coordination with other nearby communication systems. In addition, constraints imposed by thermal noise and interference generated by the various subscriber units needs to be taken into consideration. Estimates of interference are of particular concern within CDMA systems, since power is transmitted by the subscriber units over the same bandwidth irrespective of location within the cellular coverage area.

Interference on a subscriber-to-cell or cell base station link can occur when subscriber units within neighboring cells use the same CDMA communication or radio frequency channel, when mobile units within the same or different cells are using an adjacent CDMA channel, or when mobile units associated with analog cellular systems are in the vicinity of a given cell. The level or magnitude of this type of interference directly impacts the maximum number of users capable of being accommodated by a CDMA cellular system. Specifically, maximum capacity is achieved when the ratio $E_b/N_t$ (energy per information bit to total noise power spectral density) for each mobile user is at the minimum required to maintain a desired channel signal to noise ratio. Since the quantity $N_t$ will be substantially identical for each mobile signal received at a base station, providing dynamic power control for each mobile station transmitter allows maintenance of a desired $E_b/N_t$ ratio. It may be shown that this type of power control strategy is optimum in the sense of minimizing interference on the subscriber-to-cell link.

In order to determine the capacity of a CDMA system, a selected number of subscriber units may be deployed at various distances from the base station as a means of estimating the interference level corresponding to maximum system capacity. However, attempting to determine the level of interference corresponding to maximum system capacity through such field tests requires the availability of a full ensemble of mobile units. This represents a logistic problem and would preclude complete system calibration when the number of mobile units available during initial system testing was less than the number corresponding to maximum system capacity.

Accordingly, it is an object of the invention to provide a system for simulating interference due to signal transmission from subscriber units to a base station receiver within a CDMA communication system.

SUMMARY OF THE INVENTION

In summary, this invention provides a method and apparatus for simulating signal interference in a multi-channel communication system such as a wireless subscriber telephone system. The communication system is preferably a type in which users from a plurality of cells communicate information signals between one another using at least one base station and code division multiple access (CDMA) spread spectrum type communication signals. The base station has at least one base station receiver and is located in a first of the cells.

The inventive method for simulating signal interference power received by the cell-site or base station receiver includes the step of determining a first composite signal power corresponding to a sum of signal power transmitted by a first set of simulated users, which are typically located within the first cell. A determination is also made of a first normalized data rate for transmission of the composite signal. A first interference signal is then generated at a power level determined on the basis of the first composite signal power and normalized data rate. In a preferred implementation the power of the first interference signal is adjusted in accordance with an average power fluctuation resulting from closed loop power control. The first interference signal is then provided as an input to the base station receivers.

When real remote users or subscribers are already deployed in various regions of the communication system, a determination can be made as to the number of equivalent simulated users needed by reducing the number of desired simulated users by the number or real users already present. A determination of signal power transmitted by the equivalent number of users and associated normalized data rate are then used to determine the composite signal power. In addition, the real remote users can be monitored to determine both the number and actual interference or communication traffic.

The present invention also contemplates determining a second composite signal power by estimating a sum of signal power transmitted by a second set of simulated users located within cells other than the first cell. A similar determination is made of a second normalized data rate at which this signal power is transmitted by the second set of simulated users. This allows generation of a second interference signal based on the second composite signal power and second normalized data rate. The second interference signal can be used to modify the first.

Generation of the first interference signal typically involves synthesis of electrical noise over a predetermined frequency band, preferably having a relatively uniform spectral density, and then adjusting the power level of this electrical noise in accordance with the value of a product of the first composite signal power and first normalized data rate. The invention further provides a technique for utilizing a random variable sequence, such as a Gaussian random variable, to model variations in the first composite signal.

The apparatus for simulating signal interference between communication channels in the communication system generally has a power selection element which outputs the first composite signal power for signals transmitted by the first set of desired number of simulated users and a data rate generation element that outputs the first normalized data rate. A first interference signal generator coupled to the both the power selector and data rate generator produces an output signal having a signal power based on the first composite signal power and normalized data rate.

A preferred first interference signal generator uses at least one electrical noise signal generator with an output power intensity that is adjustable in response to a control signal input. At least one noise intensity controller coupled to the control input of the noise source generator and itself having inputs coupled to the power selector and data rate generator provides a control signal having a value that varies in response to changes in the signal power and data rate for simulated users. At least a second power selector can be used which outputs a second composite signal power for signals transmitted by the second set of simulated users, and the noise intensity controller is configured to also base signal generation in part on the signal power which is transmitted by these other simulated users.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

I. System Overview

In a CDMA wireless communication system such as the cellular telephone system described in U.S. Pat. No. 5,103,459 referenced above, each cell-site, also referred to as a base station, has several modulator-demodulator units or direct sequence spread spectrum modems. Each modem is capable of communicating either voice or other types of data such as facsimile or computer data. Each modem consists of a digital spread spectrum transmit modulator, at least one digital spread spectrum data receiver and a searcher receiver. Each modem at the cell-site or base station is assigned to a subscriber unit as needed to facilitate communications with the assigned subscriber unit. The subscriber units are configured as direct sequence spread spectrum modems also capable of communicating voice or other data to an assigned modem located at least one cell-site.

Figure 1:
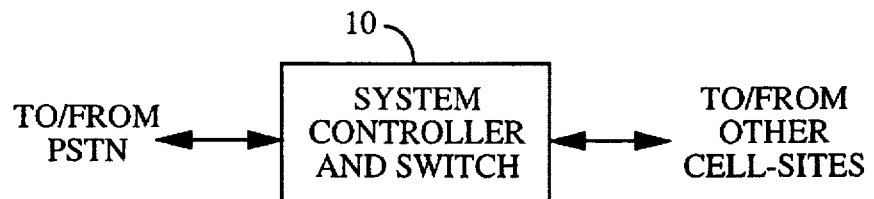
FIG. 1 is a block diagram of an exemplary cellular telephone system which may employ a noise interference simulation system according to the present invention.

An exemplary cellular telephone system, into which the noise interference simulation system of this invention may be integrated, is illustrated in FIG. 1. The system illustrated in FIG. 1 utilizes spread spectrum modulation techniques in communication between the system subscriber units or mobile telephones, and the cell-sites. Cellular systems in large cities may have hundreds of cell-site stations serving hundreds of thousands of mobile telephones or other subscriber units. The use of spread spectrum techniques, in particular CDMA, readily facilitates increases in user capacity in systems of this size as compared to conventional FM modulation type cellular systems. Although this invention is described herein with reference to the mobile cellular system of FIG. 1, it is understood that the teachings of the invention are equally applicable to CDMA communications systems in which a plurality of subscriber units are dispersed over a set of fixed locations.

As described below, the invention provides a method and apparatus for simulating the effect of signal interference received by a given cell-site station from surrounding subscriber units. In accordance with the invention, such subscriber-to-cell link interference is simulated by injecting white Gaussian noise having predetermined statistical parameters into the cell-site station receiver or receivers. When actual subscriber units are present within the cell, the simulated signal interference is in addition to that caused by signal transmissions received from the deployed subscriber units. This enables simulation of interference levels corresponding to maximum cell capacity even if the requisite number of subscriber units are not available. Alternatively, during "laboratory" testing of a cell-site receiver the injected noise comprises the exclusive source of signal power, and interference, being processed.

Since the power of the signal transmissions on the subscriber-to-cell or base station link in the exemplary system of FIG. 1 is a function of the noise power received by the various mobile or subscriber units, provision of the additional noise signal to the cell-site transmitter results in more accurate simulation. Exemplary applications for the subscriber-to-cell link interference simulations enabled by this invention include:

(i) verification of system capacity, (ii) testing of system power control and performance at a given $E_b/N_t$ ratio, and (iii) evaluation of "handoff" algorithms used when transferring communications between cell-sites.

Referring to FIG. 1, system controller and switch 10, also referred to as a mobile telephone switching office (MTSO), typically includes interface and processing circuitry for providing system control to the cell-sites. Controller 10 also controls the routing of telephone calls from a public switched telephone network (PSTN) to an appropriate cell-site for transmission to an appropriate mobile or subscriber unit. Controller 10 also controls the routing of calls from the mobile or subscriber units, via at least one cell-site, to the PSTN. Controller 10 may connect calls between subscriber units via the appropriate cell-sites since the subscriber units do not typically communicate directly with one another.

Controller 10 may be coupled to the cell-sites by various means such as dedicated telephone lines, optical fiber links, or microwave communication links. In FIG. 1, two such exemplary cell-sites 12 and 14 are shown along with mobile units 16 and 18, where each mobile includes a cellular telephone. Cell-sites 12 and 14 as discussed herein and as illustrated in the drawings, are considered as providing service to an entire cell. However, it should be understood that a cell may be geographically divided into sectors with each sector providing service to a different coverage area. Accordingly, handoffs are generally required to be made between sectors within a cell, while diversity may also be achieved between sectors as is done between cells.

In FIG. 1, lines 20a–20b and 22a–22b, along with their respective arrow heads, define possible communication links between cell-site 12 and mobile units 16 and 18, respectively. Similarly, lines 24a–24b and 26a–26b define the possible communication links between cell-site 14 and mobile units 18 and 16, respectively. Cell-sites 12 and 14 nominally transmit using equal power.

The coverage of cell-site service areas or cells is designed or mapped out in geographic shapes such that the mobile units will normally be closest to one cell-site or base station at any time, and within only one sector if the cell is divided into sectors. When the mobile unit is idle, i.e. no calls in progress, the mobile unit constantly monitors pilot signal transmissions from each nearby cell-site, and, if applicable, from a single cell-site if the cell is sectorized. As illustrated in FIG. 1, the pilot signals are transmitted to mobile unit 16 by cell-sites 12 and 14, respectively, upon outbound or forward communication links 20a and 26a. Mobile unit 16 can determine which cell it is in by comparing relative signal strength for pilot signals transmitted from cell-sites 12 and 14.

In the example illustrated in FIG. 1, mobile unit 16 may be considered closest to cell-site 12. When mobile unit 16 initiates a call, a control message is transmitted to the nearest cell-site, here cell-site 12. The nearest cell-site, 12, upon receiving the call request message, transfers the called number to system controller 10. System controller 10 then connects the call through the PSTN to the intended recipient.

Should a call be initiated within the PSTN, controller 10 transmits the call information to all the cell-sites in the area. The cell-sites in return transmit a paging message within each respective coverage area that is intended for the called recipient mobile user. When the intended recipient mobile unit "hears" or receives the page message, it responds with a control message that is transmitted to the nearest cell-site. This control message signals the system controller that this particular cell-site is in communication with the desired mobile unit. Controller 10 then routes the call through this cell-site to the mobile unit. Should mobile unit 16 move out of the coverage area for the base station in the initial cell-site, here 12, an attempt is made to continue the call by routing the call through another cell-site.

In the exemplary system of FIG. 1, orthogonal Walsh functions typically of a fixed length are assigned to user channels on the cell-to-subscriber link. In an alternative implementation orthogonal Walsh functions of varying length may be assigned to user channels on the cell-to-subscriber link. In the case of varying length Walsh functions, each channel is assigned a unique orthogonal Walsh sequence having a length predicated on the channel data rate. In the case of voice channels, the digital symbol stream for each voice signal is multiplied by its assigned Walsh sequence. The Walsh coded symbol stream for each voice channel is then multiplied by the outer PN coded waveform. The resultant spread symbol streams are then added together to form a composite waveform.

The resulting composite waveform is then modulated onto a sinusoidal carrier, bandpass filtered, translated to the desired operating frequency, amplified and radiated by the antenna system. Alternate embodiments of the invention may interchange the order of some of these operations for forming the cell-site transmitted signal. For example, it may be preferred to multiply each voice channel by the outer PN coded waveform and perform the filter operation prior to summation of all the channel signals to be radiated by the antenna. It is well known in the art that the order of linear operations may be interchanged to obtain various implementation advantages and different designs.

The waveform design of the preferred embodiment for cellular service uses the pilot carrier approach for the cell-to-subscriber link, as is described in U.S. Pat. No. 4,901,307. All cells transmit pilot carriers using the same 32,768 length sequence, but with different timing offsets to prevent mutual interference.

As is described in greater detail below, the symbol stream for a particular cellular user is combined in a first exclusive OR operation with the Walsh sequence assigned to that user. The Walsh function is typically clocked at a rate of 1.2288 MHz, while in an exemplary variable data rate system including voice, facsimile (FAX), and high/low-speed data channels the information symbol rate may vary from approximately 75 Hz to 76,800 Hz. The resulting coded waveform is combined in a second exclusive OR operation with a binary PN sequence also clocked at 1.2288 MHz. An identical binary PN sequence is used to encode each subscriber channel within a particular sector of the coverage area of the cellular system. As a consequence of the orthogonality of the Walsh coding sequences, each sequence may be used on a single RF channel associated with such a sector without inducing interference among the users within the sector.

The signals carried by each channel may further be convolutional encoded, with repetition, and interleaved in order to provide error detection and correction functions which allow the system to operate at a much lower signal-to-noise and interference ratio. Techniques for convolutional encoding, repetition and interleaving are well known in the art. The resulting signals are then generally modulated onto an RF carrier and summed with the pilot and setup carriers, along with the other voice carriers. Summation may be accomplished at several different points in the processing such as at the IF frequency, or at the baseband frequency either before or after multiplication by the PN sequence associated with the channels within a particular cell.

Each voice carrier may also be multiplied by a value that sets its transmitted power relative to the power of the other voice carriers. This power control feature allows power to be allocated to those links that require higher power due to the intended recipient being in a relatively unfavorable location. Means are provided for the subscribers to report their received signal-to-noise ratio to allow the power to be set at a level that provides for adequate performance without wasting energy. The orthogonality property of the Walsh functions is not disturbed by using different power levels for the different voice carriers, provided that time alignment is maintained.

Figure 2:
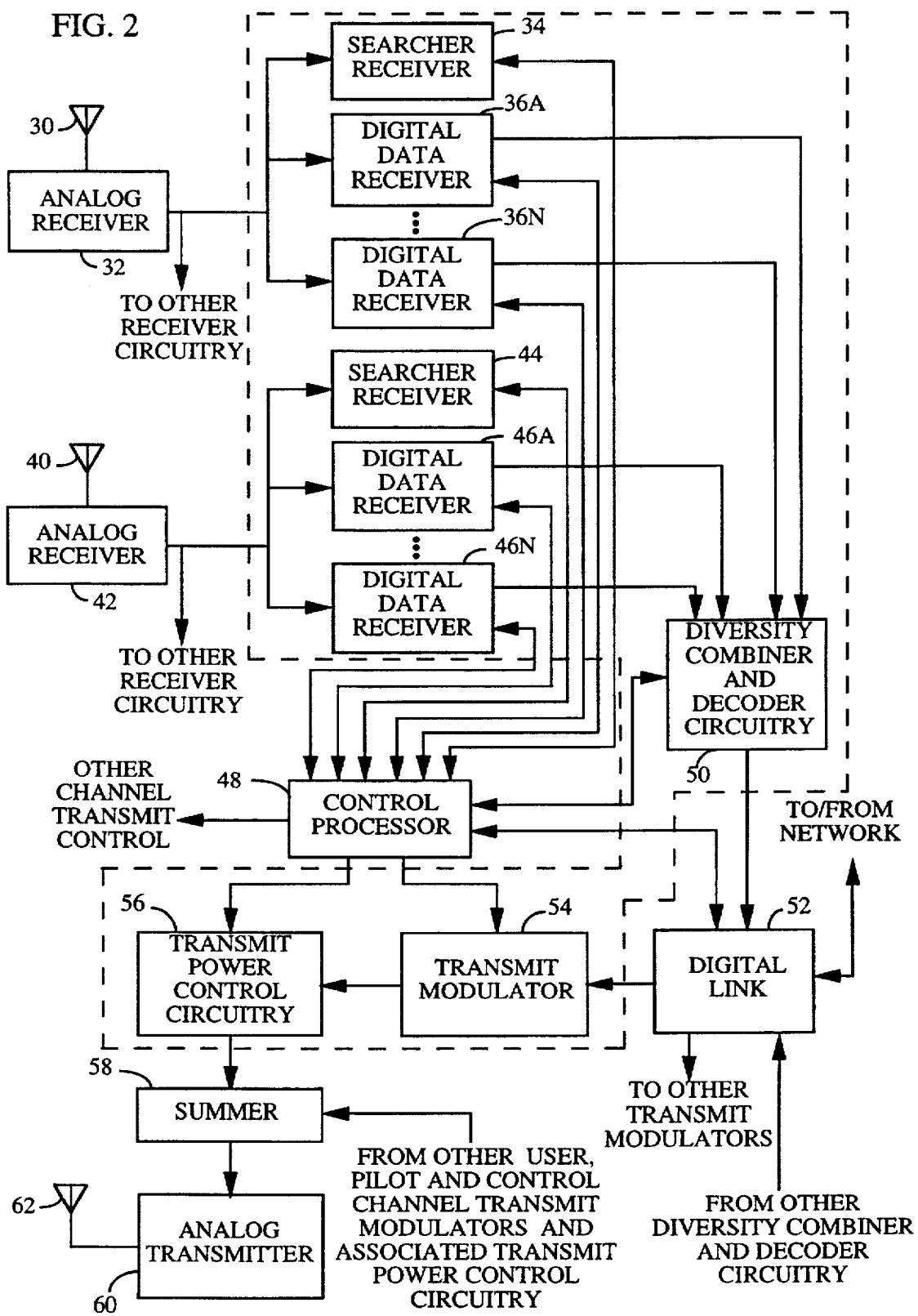
FIG. 2 illustrates a block diagram of exemplary cell-site equipment.

FIG. 2 illustrates, in block diagram form, an exemplary embodiment of cell-site equipment. At the cell-site, two receiver systems are utilized with each having a separate antenna and analog receiver for space diversity reception. In each of the receiver systems, the subscriber-to-cell link signals are processed identically until the signals undergo a diversity combination process. The elements within the dashed lines correspond to elements used in communications between the cell-site base station and one subscriber unit. The output of the analog receivers are also provided to other elements used in communications with other subscriber units.

In FIG. 2, the first receiver system comprises an antenna 30, an analog receiver 32, a searcher receiver 34 and digital data receivers 36A–36N, and additional searcher and digital data receivers (not shown). Searcher receiver 34 and digital data receivers 36A–36N are assigned to process the signal from one subscriber unit, with the signal typically experiencing multipath propagation. Searcher receiver 34 is used to assign each of the digital data receivers 36A–36N to demodulate a respective multipath propagation of one single subscriber unit signal. Antenna 30 and analog receiver 32 of the first receiver system are also shared with other searcher and digital data receivers (not shown) which are similarly associated with the digital data receiver assignment and demodulation for other subscriber unit signals.

The second receiver system is similarly constructed and includes an antenna 40, an analog receiver 42, a searcher receiver 44 and digital data receivers 46A–46N, along with additional searcher and digital data receivers (not shown). Searcher receiver 44 and digital data receivers 46A–46N are assigned to process a multipath signal from the one subscriber unit. Searcher receiver 44 is again used to assign each of the digital data receivers 46A–46N to demodulate a respective multipath propagation of the one subscriber unit signal. Antenna 40 and analog receiver 42 of the second receiver system are also shared with other searcher and digital data receivers (not shown) which are similarly associated with the digital data receiver assignment and demodulation for other subscriber unit signals.

The cell-site also includes cell-site control processor 48 which is coupled to data receivers 36A–36N and 46A–46N along with searcher receivers 34 and 44. Control processor 48 provides among other functions, operations such as signal processing; timing signal generation and control; signal power control; and control over handoff, diversity, signal combining interfacing with the MTSO. In a preferred embodiment, the control processor 48 will include a table of orthogonal Walsh code sequences for assignment to subscriber units.

Both receiver systems are coupled by data receivers 36A–36N and 46A–46N to diversity combiner and decoder circuitry 50. Digital link 52 is connected to receive the output of diversity combiner and decoder circuitry 50. Digital link 52 is also coupled to control processor 48, cell-site transmit modulator 54 and the MTSO digital switch (FIG. 1). Digital link 52 is utilized to communicate signals between the MTSO using cell-site transmit modulator 54 or circuitry 50, under the control of control processor 48.

Signals intended to be communicated to the one subscriber unit are provided via digital link 52 to transmit modulator 54 where they are modulated as a spread spectrum signal. The spread spectrum signal is then transferred to transmit power control circuitry 56 which, under the control of control processors, 48, sets the transmit power for the signal. The power controlled signal is then summed with other signals for transmission in the channel in summer 58, the output of which is provided to analog transmitter 60 and antenna 62.

II. Overview of Subscriber-to-Cell Link Signal Interference

When receiving a signal from a particular subscriber unit the cell-site receiver is subjected to interference from other subscriber units within the same cell, as well as from subscriber units in neighboring cells. In calculating interference from subscriber units located within the same cell as the cell-site receiver, it is assumed that the interference spectral density is uniform (white) and proportional to the number of users, i.e., subscriber units. The assumption of uniform spectral density is predicated on the existence of a large number of users within the cell, i.e., six or more, in accordance with the central-limit theorem. See, for example, *Communication Systems and Techniques* by M. Schartz, W. R. Bennett and S. Stein; McGraw Hill, N.Y. (1966). For convenience of description it is also assumed that the number of users is the same within each cell, and that each cell includes a generally uniform distribution of users.

As noted in the Background of the Invention, maximum system capacity is achieved when the ratio $E_b/N_t$ for each subscriber user is at the minimum required to maintain a desired channel signal to noise ratio. This result is effected by providing dynamic power control for each subscriber station or unit transmitter, and results in minimization of interference on the subscriber-to-cell link. Accordingly, the simulation methodology described below contemplates employing such a power control strategy.

For a cell including N subscriber units, each of which transmits signals incident upon the cell-site receiver at a power of C watts, the received interference $X_1$ may be determined according to the relationship:

$$X_1 = (N-1)Cn \qquad (1)$$

where the parameter n corresponds to an average user voice activity factor.

Similarly, the interference $X_2$ developed at a particular cell-site receiver due to transmissions from subscriber units within surrounding cells is determined according to the relationship:

$$X_2 = \left(\frac{1}{F} - 1\right)NCn \qquad (2)$$

where the additional parameter F specifies the frequency re-use efficiency between cells of the CDMA system being simulated. The re-use efficiency (F) is defined as the ratio of interference from subscriber units within a given cell to the composite interference generated by the subscriber units within all cells.

In an exemplary CDMA system, the RF signal power on the subscriber-to-cell link is attenuated in accordance with a fourth power propagation law. In such an exemplary system, the statistical change in signal power as a function of time, i.e., signal fading, can be modeled as a log-normal random variable having a standard deviation of approximately 8 dB. Assuming a uniform distribution of users within the exemplary communication system, the following discussion shows that the interference contributed by users in other cells is approximately equivalent to 66% of the interference generated by users within a given cell (F=0.6).

Figure 3:
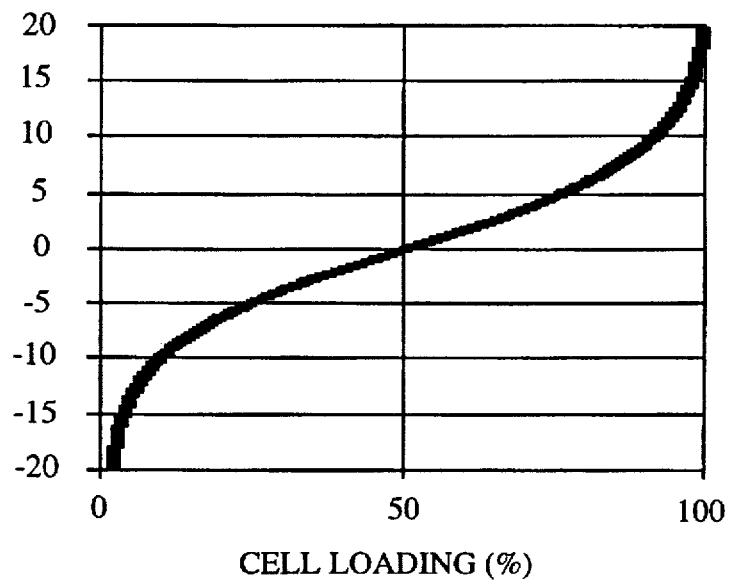
FIG. 3 is a graphical representation of the variation in the sum of interference values $X_1$ and $X_2$, relative to thermal noise, as a function of user loading within a cell under evaluation.

Referring now to FIG. 3, a graphical representation of how the sum of interference values $X_1$ and $X_2$ varies, relative to the thermal noise, as a function of cell loading is shown. The loading of a particular cell corresponds to the ratio between the number of active users and the maximum number of users capable of being serviced within the cell. The maximum number of users is dependent upon the value of $E_b/N_t$ for the cell or sector thereof, the average voice activity factor n, and the frequency re-use efficiency F. The CDMA processing gain $W/R_b$, where W and $R_b$ respectively denote the bandwidth and data rate of signal transmission on the subscriber-to-cell link, also influences the maximum number of users $N_{max}$. As an example, using values of $E_b/N_t=6$ dB, n=0.4, F=0.6, and $W/R_b=128$, the relationship $N_{max}=F(W/R_b)/n(E_b/N_t)$ yields a maximum number of users of 48. In the representation of FIG. 3, the thermal noise is calculated based upon a cell-site receiver having a noise figure of 5 dB. In addition, FIG. 3 indicates that a cell loading of 50% corresponds to the situation in which the signal interference power is equivalent to the power of the thermal noise, i.e., one-half of the received signal power is thermal noise.

III. Analysis of Subscriber-to-Cell Link Signal Interference

The signal interference on, the subscriber-to-cell link includes a pair of uncorrelated components: namely, interference noise arising from $N_u$ subscriber units within the cell being simulated, i.e., the simulated cell; and interference noise from K surrounding cells. The number of users within each of the surrounding cells is denoted by $N_{ocj}$, where j=1,2, . . . ,K. The simulated cell corresponds to the cell in which a cell-site receiver is located into which a simulated interference signal is injected.

In accordance with the invention, a simulated interference signal representative of an equivalent number $N_{eq}$ of simulated subscriber users is supplied to the cell-site receiver within the simulated cell. The power and data rate of this interference signal corresponds to the average power and normalized data rate, respectively, of the $N_{eq}$ simulated users dispersed throughout the simulated cell and the K surrounding cells. The equivalent number $N_{eq}$ of users being simulated may be expressed as:

$$N_{eq} = N_u - N_r + \frac{\alpha}{K}\sum_{j=1}^{K} N_{ocj} \qquad (3)$$

where $N_r$ denotes the number of the "real" users actually deployed during the course of the simulation within the simulated cell, and a is a constant representative of the effect of interference from subscriber units in surrounding cells. In a particular exemplary embodiment a has been analytically estimated to be approximately ⅔, with this value subsequently being verified through numerical simulation and field testing.

The average interference signal power generated by the equivalent number $N_{eq}$ of simulated users is given by the relationship:

$$C = X_{eq} r_{eq} \qquad (4)$$

where $X_{eq}$ denotes the power at which signals are transmitted by the $N_{eq}$ simulated subscriber users, and where $r_{eq}$ represents the normalized data rate of these signal transmissions.

As a consequence of power control signals supplied by the cell-site base station to the subscriber units, there will exist fluctuations $X_{eq}$ in a nominal value of power $S_{nom}$ transmitted by the simulated subscriber units. It follows that $S_{eq}$ may be represented as:

$$S_{eq} = S_{nom} X_{eq} \qquad (5)$$

where the value of $S_{nom}$ depends upon the number of simulated users $N_{eq}$, as well as upon a specified ratio of energy per information bit to noise energy, i.e., $E_b/N_o$, to be received at the cell-site receiver within the simulated cell.

If the number of simulated users $N_{eq}$ is greater than or equal to that required to invoke the central limit theorem, i.e., $N_{eq} \approx 6$ or more, then $r_{eq}$ and $X_{eq}$ may be represented as Gaussian random variables according to the relationships:

$$r_{eq} = \frac{1}{N_{eq}} \sum_{i=1}^{N_{eq}} r_i \quad (6)$$

$$X_{eq} = \frac{1}{N_{eq}} \sum_{i=1}^{N_{eq}} X_i \quad (7)$$

The discrete random variable $r_i$ is representative of the rate of signal transmission from the $i^{th}$ simulated user. The set of random variables $r_i$, i=1 to $N_{eq}$, are assumed to be independent and identically distributed (i.i.d). When the signal transmissions from the simulated users carry speech information, the random variables $r_i$ are indicative of the speech activity of the various subscriber users.

In an exemplary embodiment, such speech activity is modeled by s defining the random variables $r_i$ such that $r_i \in [1.0, 0.5, 0.25, 0.125]$, where $r_i=1.0$ corresponds to speech transmission at the maximum rate (full rate, e.g. 9.6 kbps), and $r_i=0.5$, 0.25 and 0.125 denote speech transmission at one-half, one-fourth, and one-eighth of the maximum rate, respectively, e.g. 4.8 kbps, 2.4 kbps and 1.2 kbps, respectively. An empirically determined probability vector P, where $P=[p_1, p_2, p_3, p_4]$, specifies the probability of speech transmission at the maximum, one-half, one-fourth, and one-eighth rates, respectively. In a particular implementation, it has been found that the distribution of speech activity may be accurately represented by a vector P given by:

$$P=[p_1, p_2, p_3, p_4]=[0.4028, 0.0464, 0.0702, 0.4806]. \quad (8)$$

The set of random variables $X_i$, i=1 to $N_{eq}$, are also assumed to be independent and identically distributed (i.i.d) log-normal random variables capable of being statistically characterized as set forth below. When the number of simulated users $N_{eq}$ is less than that required for invocation of the central limit theorem, the random variables $r_i$ and $X_i$ will generally be defined in terms of empirically-determined distributions.

IV. Statistical Characterization of Subscriber-to-Cell Link Interference

In accordance with the central limit theorem, the random variable $r_{eq}$ can be approximated by a Gaussian random variable of mean $E\{r_{eq}\}$ and variance $\text{var}\{r_{eq}\}$, where:

$$E\{r_{eq}\} = E\{r_i\} \quad (9)$$

$$\text{var}\{r_{eq}\} = \frac{1}{N_{eq}} \text{var}\{r_i\}$$

and in which:

$$E\{r_i\}=p_1+0.5p_2+0.25p_3+0.125p_4 \quad (10)$$

$$E\{r_i^2\}=p_1+0.25p_2+0.0625p_3+0.015625p_4 \quad (11)$$

$$\text{var}\{r_i\}=E\{r_i^2\}-(E\{r_i\})^2 \quad (12)$$

The variable $X_i$ may be further characterized in terms of first and second moments, $$E\{X_i\}=10^{\sigma^2/200a} \quad (13)$$

$$E\{X_i^2\}=10^{2\sigma^2/100a} \quad (14)$$

where, $$a=10 \log e \quad (15)$$

A similar invocation of the central limit theorem allows the variable $X_{eq}$ to be represented as a Gaussian random variable having the following mean and variance $$E\{X_{eq}\} = E\{X_i\} \quad (16)$$

$$\text{var}\{X_{eq}\} = \frac{1}{N_{eq}} \text{var}\{X_i\} \quad (17)$$

As noted above, the distribution of the sum of a set of M log-normal random variables approaches a Gaussian distribution when M is sufficiently large to satisfy the requirements of the central limit theorem, i.e., M>6. If the log-normal random variable $X_i$ is not independent and identically distributed, then each will generally be approximated by another log-normal random variable rather than by a Gaussian random variable. The resulting equivalent normal distribution will generally have the same first and second moments as those characterizing the exact sum, and will best approximate the exact sums defining $r_{eq}$ and $X_{eq}$ for intermediate values thereof.

Figure 4:
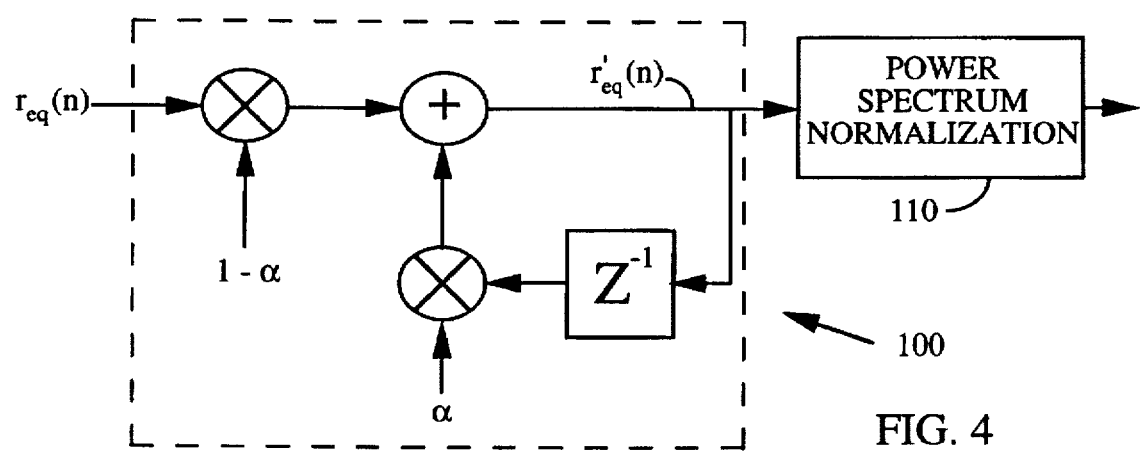
FIG. 4 shows a first-order digital noise correlation filter for correlating an independent Gaussian random process used in simulating speech activity.

It is anticipated that the correlation function characteristic of typical speech activity may be represented by a double-exponential function of the form:

$$R(t)=\exp\{-|t/\tau_v|\}, \quad (18)$$

where $\tau_v$ denotes the correlation time of speech activity. Referring to FIG. 4, the independent Gaussian random process $r_{eq}$ defined above may be correlated in this manner by passing it through a first-order digital noise correlation filter 100. In particular, application of a time-sampled uncorrelated Gaussian sequence $r_{eq}(n)$ to the correlation filter 100 yields an output sequence $r'_{eq}(n)$ in accordance with the time-domain input/output relationship:

$$r'_{eq}(n)=\alpha r'_{eq}(n-1)+(1-\alpha)r_{eq}(n), \quad (19)$$

where the parameter a is determined in the manner described below. In this way the correlation of the sequence $r'_{eq}(n)$ is made to approximate the double-exponential correlation of typical speech activity.

Assuming the correlation time $\tau_\mu$ for typical speech activity to be on the order of 200 ms., the filter 100 should be designed to have a 3 dB analog cut-off frequency $\omega_1$ of $2 \pi/\tau_{84} =10 \pi$ rad/sec., which corresponds to a 3 dB digital cut-off frequency of $$\omega_1 T_1 = \frac{2\pi}{50\tau_v} = 0.2\pi \text{ rad.} \quad (20)$$

It is anticipated that the filter 100 will operate at a sampling frequency $f_{s1}$ of 50 Hz, which in an exemplary system is equivalent to a repetition rate for frames of voice data (20 ms. in duration) processed by the cell-site receiver. The z-domain transfer function of the filter 100 filter may be written as:

$$H_1(z) = \frac{1-\alpha}{1-\alpha z^{-1}} \quad (21)$$

where the DC gain (z=0) is:

$$H(0)=1. \quad (22)$$

For a 3 dB cut-off frequency of $0.2\pi$, it is required by definition that $|H_1(0.2\pi)|^2 = 0.5$. Accordingly, $$\frac{(1-\alpha)^2}{(1-\alpha\cos 0.2\pi)^2 + (\alpha\sin 0.2\pi)^2} = \frac{1}{2} \quad (23)$$

which yields a value for a of 0.54411322.

The noise bandwidth of the filter 100 is given by:

$$B_n = \frac{1}{2\pi} \int_{-\pi}^{\pi} |H(\omega)|^2 d\omega = \frac{(1-\alpha)^2}{1-\alpha^2} \quad (24)$$

In order to maintain identity between the power spectra of the sequences $r'_{eq}(n)$ and $r_{eq}(n)$, the variance of $r'_{eq}(n)$ is divided by the value of the noise bandwidth obtained by substituting the parameter a into equation (24). Referring to FIG. 4, such power spectrum normalization may be performed in an element 110 using a microprocessor, hardware divider or the like generally as is well known in the art.

Similarly, the power control process is simulated by passing the power fluctuation random process $X_{eq}$ through a low-pass filter characterized by a 3 dB analog cut-off frequency $\omega_2$. Assuming a correlation time $\tau_p$ for fluctuations arising from power control on the order of 12.5 msec., the power control low-pass filter should be designed such that $\omega_2 = 2\pi/\tau_p \approx 160\pi$ rad/sec. This is equivalent to a digital cut-off frequency of $\omega_2 T_2 = 2\pi/800\tau_p = 0.2\pi$ rad.

V. Apparatus for Interference Simulation

As was noted above, the invention provides a method and apparatus for simulating the effect of signal interference received by a given cell-site station of a multiple-access communication system from surrounding subscriber units. In accordance with the invention, such subscriber-to-cell link interference is simulated by injecting a noise signal having predetermined statistical parameters into the cell-site station receivers. Alternatively, a noise signal could be transmitted by one or more subscriber units to the cell-site station under evaluation in order to simulate the effect of interference from other subscriber units. In the latter instance, the injected signal would be formulated so as to account for the effects of propagation over the transmission path between the cell-site and the subscriber unit under test. The present invention thus enables the performance of a given multiple-access communication system to be evaluated prior to network deployment by simulating the level of interference expected to be experienced during normal operation. The multiple-access systems to which the teachings of the present invention may be applied include, for example, the United States version of Time Division Multiple Access (USTDMA), the pan-European Global System for Mobile Communication (GSM), and CDMA communication systems.

Figure 5:
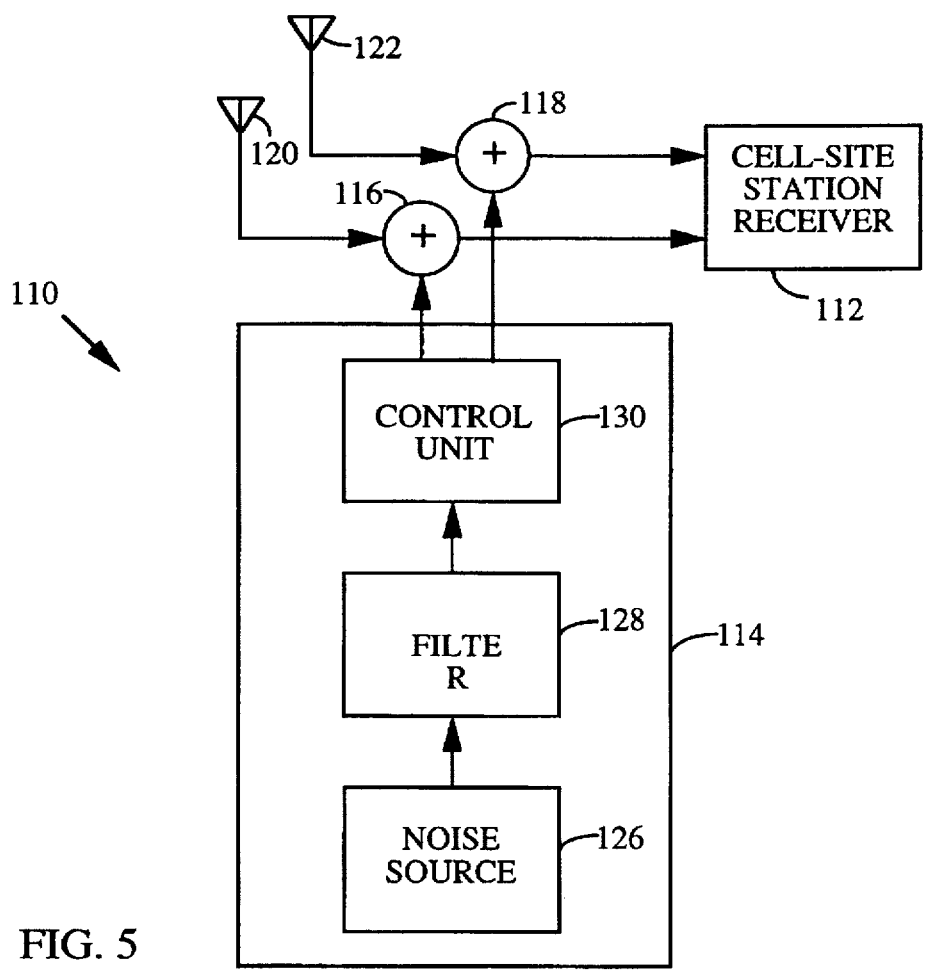
FIG. 5 shows a simplified block diagram of a receive section of an exemplary cell-site station employing a preferred embodiment of an interference simulation apparatus of the present invention.

Turning now to FIG. 5, a simplified block diagram of the receive section 110 of an exemplary cell-site station modified to include a preferred embodiment of the interference simulation apparatus of the present invention is shown. The receive section 110 includes a cell-site station receiver 112, as well as an interference simulation apparatus 114 designed to simulate the interference created by subscriber units in cells proximate the cell in which the cell-site station under test is located. The interference signal produced by the simulation apparatus 114 is combined in summers 116 and 118 together with the signals received from cell-site station antennas 120 and 122, respectively. The resulting composite signal is then processed by the cell-site station receiver 112 in the conventional manner.

The simulation apparatus 114 includes a noise source 126 for generating interference noise, typically a white Gaussian noise signal, of a predefined spectral density. The noise signal from noise source 126 is then passed through a bandpass filter 128 and provided to control unit 130. The passband center frequency of noise filter 128 is selected to be the same as the center frequency of the subscriber unit to cell-site station, i.e., uplink, channel being simulated. Similarly, the bandwidth of filter 128 is specified to be substantially equivalent to the spectral width of the traffic channels utilized by the multiple-access system under evaluation. For example, for simulation of interference in USTDMA systems the bandwidth of filter 128 will preferably be on the order of 30 kHz. In a like manner, a filter bandwidth of approximately 200 kHz would be employed during simulation of a GSM cellular communication system.

Referring again to FIG. 5, control unit 130 supplies an interference signal to summers 116 and 118 on the basis of the signal produced by the filter 128. In an exemplary implementation, control unit 130 may be realized, for example, by an adjustable attenuator disposed to provide an interference level in accordance with various aspects of the system under evaluation. For example, the requisite interference level will generally be influenced by the number of neighboring subscriber units expected to contribute to the received signal interference, the locations of such subscriber units relative to the cell-site station under evaluation, and the propagation characteristics of the communication links between these subscriber units and the cell-site station. A more detailed description of a simulation apparatus specifically directed to a CDMA communication system is described next with reference to FIG. 6.

Figure 6:
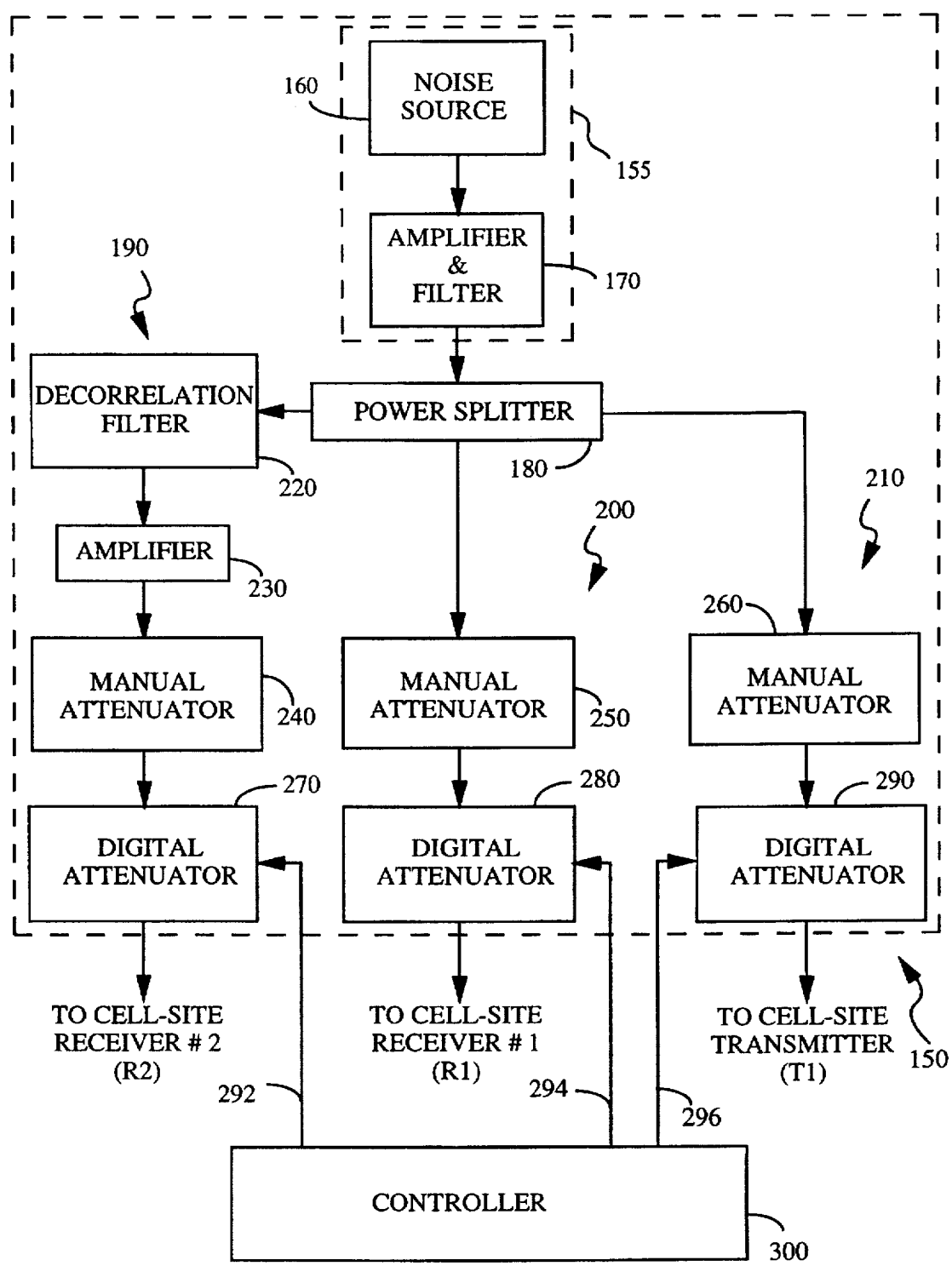
FIG. 6 illustrates a block diagram of a preferred embodiment of an interference simulation apparatus of the invention.

FIG. 6 shows a block diagram of a preferred embodiment of an interference simulation apparatus 150 constructed and operating according to the principles of the invention. Simulation apparatus 150 includes a source of random noise 160 disposed to provide "white", i.e., spectrally flat, noise at a power of approximately 5 dBm over a 100 MHz bandwidth centered at approximately 70 MHz. The electrical noise produced by source 160 will typically have a crest factor (ratio of maximum value to the rms value of a sample waveform) of approximately 5, and is processed by an amplification and filtering network 170 prior to being supplied to a 3-way power splitter 180.

Filtering network 170 will preferably include an amplifier, a digital filter having a transfer function substantially identical to that of noise correlation filter 100, and provision for performing power spectrum normalization operation as was discussed with reference to element 110 of FIG. 4. Filtering network 170 delivers correlated noise energy having a bandwidth limited to 1.3 MHz, and a spectral density of approximately −81 dBm/Hz, to power splitter 180. As shown in FIG. 6, power splitter 180 is connected to first and second receiver attenuation paths 190 and 200, as well as to a transmitter attenuation path 210. The attenuated noise energy produced by attenuation paths 190 and 200 is respectively injected into first and second cell-site receivers (not shown), while the noise energy generated by transmitter attenuation path 210 is supplied to the cell-site transmitter (not shown) within the simulated cell.

Power splitter 180 delivers noise energy of −59 dBm/Hz to both receiver attenuation paths 190 and 200, and noise of energy of −59 dBm/Hz to transmitter attenuation path 210. In order to decorrelate the noise energy provided to the first and second receiver attenuation paths 190 and 200, the first path 190 includes the combination of a surface acoustic wave (SAW) filter 220 and an amplifier 230. Filter 220 delays the noise energy in attenuation path 190 relative to the noise energy in attenuation path 200 such that the two paths are mutually independent. Such path independence is necessary in order to maintain reception diversity between the cell-site receivers. Amplifier 230 compensates for the loss induced by filter 220 by providing a net gain of approximately 3 dB.

First and second receiver attenuation paths 190 and 200, and transmitter attenuation path 210 include first, second and third manual attenuator arrangements 240, 250 and 260, respectively. Each such arrangement is preferably capable of providing approximately 80 dB of attenuation by incorporating several manually-controlled RF power attenuators. In addition, digitally-controlled RF power attenuators 270, 280 and 290 of the conventional type may be adjusted to provide approximately 63.5 dB of attenuation. In order to facilitate system calibration, directional couplers (not shown) may be connected to the output ports of digital attenuators 270, 280 and 290.

As shown in FIG. 6, the settings of digital attenuators 270, 280 and 290 within the interference generator are adjusted by a controller 300. Digitally-controlled attenuators 270, 280 and 290, in conjunction with manual attenuators 240, 250 and 260, cooperate to regulate the power of the simulated RF signal interference provided to the pair of cell-site receivers, and to the cell-site transmitter, respectively. Controller 300 may be implemented by using a microprocessor or the like, and in an exemplary implementation is realized using an 80C188 type microprocessor operative at an effective clock rate of 12.5 MHz.

VI. Development of Interference Simulation Signals

Figure 7:
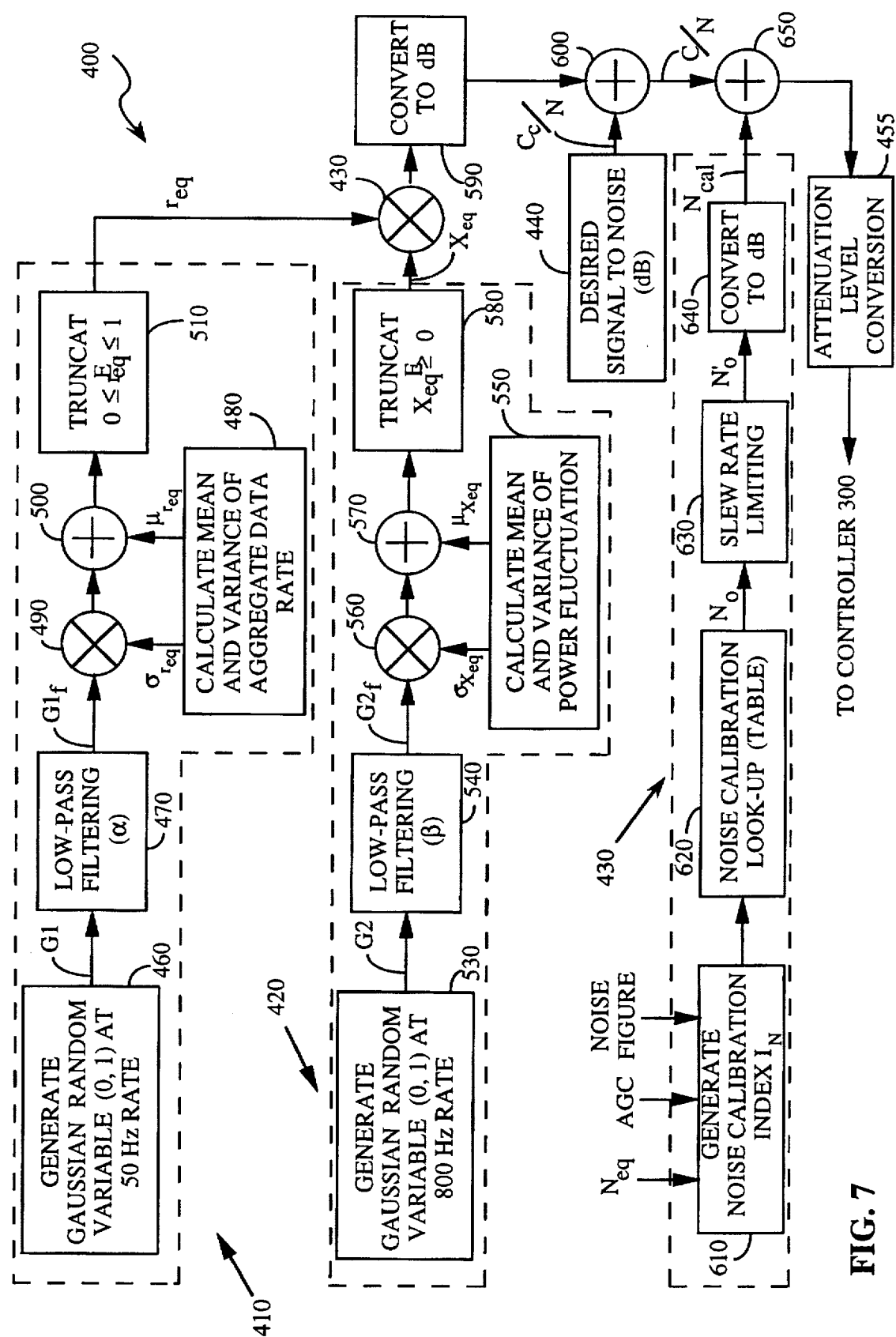
FIG. 7 depicts a flow chart of the procedure for developing interference simulation signals contemplated by the invention.

Referring now to FIG. 7, a flow chart 400 is shown for a procedure employed in developing the interference simulation signals contemplated by this invention. In particular, the procedure outlined in FIG. 7 provides the signal interference control information used by controller 300 in adjusting the settings of digital attenuators 270, 280 and 290 (FIG. 6). In this way, control is maintained over the magnitude of the interference simulation signals provided to the cell-site receivers and transmitter.

The procedure represented by FIG. 7 was developed based upon a CDMA system in which:

(i) the data rates of the subscriber users being simulated are capable of being represented by independent, identically-distributed discrete random variables;

(ii) the power levels of the signal transmissions from the subscriber users being simulated are amenable to representation by independent, log-normally distributed random variables;

(iii) the signal transmissions from users within the simulated cell and surrounding cells are mutually uncorrelated, and are uncorrelated with transmissions from neighboring CDMA systems; and (iv) fluctuations in the data rate and power levels of the signal transmissions from the simulated users are uncorrelated.

As shown in FIG. 7, first and second process subroutines 410 and 420 of procedure 400 provide digital sequences defining values of the data rate coefficient $r_{eq}$ and power fluctuation coefficient $X_{eq}$. These sequences are multiplied together in a step 430, with the resulting product being used to modulate the desired level of a signal source, provided in a step 440, having a desired constant signal to noise ratio signal (C$_s$/N). This operation results in the production of a time-varying signal to noise sequence generally indicated by C/N. The constant C$_s$/N signal is proportional to the number of simulated users N$_{eq}$, and is defined according to:

$$\text{"desired set point"} = \frac{N_{eq}\overline{S}\overline{r}}{\overline{S} + N_oW} = \frac{C}{\overline{S} + N_oW} \quad (25)$$

where $\overline{S}$ denotes the power of the signal from a single user received at the cell, $\overline{r}$ denotes the expected normalized data rate, W denotes the bandwidth of the CDMA system being simulated, and N$_o$ represents the energy of ambient thermal noise.

The procedure 400 further includes a third subroutine 450 for generating a noise calibration signal Ncal which is derived from the automatic gain control (AGC) signal utilized by the cell-site receiver. The noise calibration signal N$_{cal}$ is used to convert the modulated signal C/N into a simulated interference signal level C to be injected into the cell-site base station receiver. Signal C is used, in conjunction with the settings for manual attenuators 240, 250, 260 and the power of noise generator 155 (FIG. 6), in a computation or conversion step 455 to generate the digital attenuator settings to be provided to controller 300.

Referring again to FIG. 7, first subroutine 410 includes a step 460 for generating a random Gaussian sequence at a frequency of 50 Hz. That is, a standard Gaussian random variable is generated every 20 ms. The resulting sequence G1 is low-pass filtered in a filtering step 470 in accordance with the correlation parameter α, where the filter bandwidth B$_{n1}$ is defined below by relationship 26, to produce the filtered sequence G1$_f$.

$$B_{n1} = \frac{(1-\alpha)^2}{(1-\alpha^2)} \quad (26)$$

The filtered sequence G1$_f$ is then normalized or scaled in power by the mean and variance of the aggregate data rate $r_{eq}$ which are calculated in a step 480 as follows:

$$\mu_{req} = \mu_{ri} \quad (27)$$

$$\sigma_{req}^2 = \frac{1}{N_{eq}B_{n1}} \sigma_{ri}^2 \quad (28)$$

where, $$m_{ri} = p_1 + 0.5p_2 + 0.25p_3 + 0.125p_4 \quad (29)$$

$$E\{r_i^2\} = p_1 + 0.25p_2 + 0.0625p_3 + 0.15625p_4 \quad (30)$$

$$\sigma_{req}^2 = E\{r_i^2\} - (\mu_{ri})^2 \quad (31)$$

The mean and variance are thus used to scale the filtered sequence G1$_f$ through a multiplication step 490 using the computed mean term and an addition or summation step 500 using the variance term, such that:

$$r_{eq} = \sigma_{req}G1_f + \mu_{req} \quad (32)$$

with the resulting sequence of data rate coefficients $r_{eq}$ then being truncated in a step 510 to fall within a range of $0 \leq r_{eq} \leq 1.0$.

Again referring to FIG. 7, the coefficients $X_{eq}$ are generated in a substantially similar fashion by second subroutine 420. First, a standard Gaussian random variable G2 is generated in a step 530 every 1.25 ms., i.e., at a frequency of 800 Hz. Sequence G2 is low-pass filtered in a step 540 in accordance with the filter parameter β, where the filter bandwidth $B_{n2}$ is defined according to relationship 33 below, to produce the filtered sequence $G2_f$.

$$B_{n2} = \frac{(1-\beta)^2}{(1-\beta^2)} \quad (33)$$

The filtered sequence $G2_f$ is then normalized or scaled in power using the mean and variance associated with the random process $X_{eq}$ which is calculated in a step 550 in the following manner:

$$\mu_{X_{eq}} = \mu_{X_i} \quad (34)$$

$$\sigma^2_{X_{eq}} = \frac{1}{N_{eq}B_{n2}} \sigma^2_{X_i} \quad (35)$$

$$E\{X_i\} = 10^{(\mu_x + \sigma_x^2/2a)/10} \quad (36)$$

$$E\{X_i^2\} = 10^{(2\mu_x + 2\sigma_x^2/a)/10} \quad (37)$$

$$\sigma^2_{X_i} = E\{X_i^2\} - (E\{X_i\})^2 \quad (38)$$

where, $$a = 10 \log(e) \quad (39)$$

The mean and variance are thus used to scale the filtered sequence $G2_f$ through a multiplication step 560 using the computed mean term and an addition step 570 using the variance term, such that:

$$X_{eq} = \sigma_{X_{eq}} G_2 + \mu_{X_{eq}} \quad (40)$$

with the resulting sequence of data rate coefficients $X_{eq}$ being truncated in a step 580 such that $X_{eq} > 0$.

As noted above, the coefficients $r_{eq}$ and $X_{eq}$ comprising the data rate and power fluctuation sequences are then digitally multiplied together in step 430. Since, in the preferred implementation, the frequencies of the data rate and power fluctuation sequences are 50 Hz and 800 Hz, respectively, each data rate coefficient $r_{eq}$ will be modulated by 800/50, i.e., by sixteen, distinct power fluctuation coefficients $X_{eq}$. The resulting 800 Hz sequence of modulated data rate coefficients are then converted in a step 590 to a decibel (dB) representation and acted on in a summation step 600. The combination of the sequence $C_c/N$ and of the sequence of modulated data rate coefficients in summation step 600 yields the sequence C/N.

Again referring to FIG. 7, production of the signal $N_{cal}$ is initiated within the third subroutine 450 by a step 610 in which an index value $I_N$ is generated for use with a noise calibration look-up table in a step 620. The index value $I_N$ is generated on the basis of the receiver AGC signal and noise figure, and in accordance with the number of simulated users $N_{eq}$. During initial system calibration, digital attenuators 270 and 280 (FIG. 6) are incremented from zero to, for example, 63.5 dB in 0.5 dB increments. After each incremental attenuation, the values of the AGC control voltages produced by cell-site receivers R1 and R2 are recorded in a look-up table. The look-up table entries will be dependent upon the level of attenuation provided by manual attenuators 240 and 250, which in an exemplary embodiment are adjusted to provide a nominal attenuation of 30 dB.

In addition, the presence of an external jamming signal may be simulated by incrementally increasing the index value $I_N$ which would otherwise be used to address the noise calibration look-up table in step 620.

As shown in FIG. 7, the sequence of indices $I_N$ provided to the look-up table results in a sequence of noise calibration coefficients $N_o$ being provided to a slew-rate limiter in a step 630. The slew rate limiter produces a limited sequence of coefficients $N_o'$ by constraining magnitude variations between successive calibration coefficients $N_o$ to within a predefined range. The output of the slew rate limiter in step 630 is converted to a decibel representation in a step 640, and is then used in a summation step 650 to modulate the sequence C/N. In this way, the slew rate limiting prevents abrupt magnitude changes from occurring in the sequence C' due to sudden change in the receiver AGC signal. For example, the incidence of a jamming signal or the like upon the cell-site receiver induces a nearly instantaneous change in the magnitude of the AGC signal. This change in magnitude is reflected by a corresponding change in the sequence of indices $I_N$, and hence also in the sequence of noise calibration coefficients $N_o$. Slew rate limiting step 630 ensures that variation in the limited sequence $N_o'$, and, hence, also in the decibel representation $N_{cal}$, does not exceed that capable of being tracked by the sequence C/N.

Figure 8:
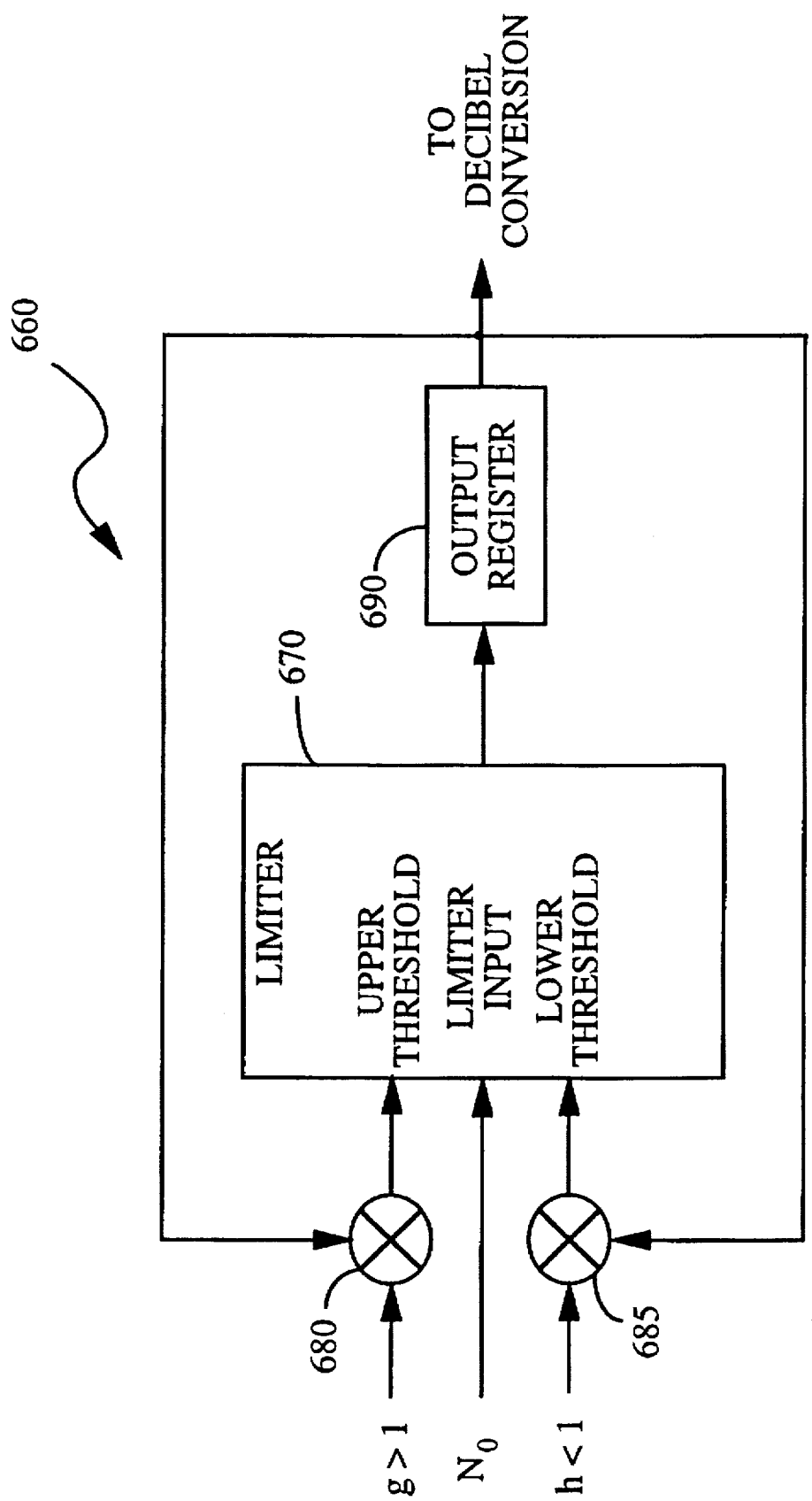
FIG. 8 is a block diagram of a preferred implementation of a slew rate limiter useful for limiting variations between successive coefficients within a sequence of noise calibration coefficients.

FIG. 8 depicts a block diagram of a preferred implementation of a slew rate limiter useful for implementing limiting step 630. A slew rate limiter 660 is shown which includes a limiter circuit 670 for comparing each coefficient $N_o$ to upper and lower threshold levels dependent upon the magnitude of the preceding coefficient $N_o$. As shown in FIG. 8, an upper limiting threshold level is defined by the product $gN_o$ provided by a first multiplier 680, while a lower limiting threshold is defined by the product $hN_o$ provided by a second multiplier 685. The coefficients g and h are chosen based upon the desired maximum rate of change of the sequence of coefficients $N_o'$, and determine the value of each of the coefficients $N_o'$ sequentially latched within output register 690. Accordingly, the slew rate limiter 660 may be described by the following non-linear input/output equation:

$$N'_o(n) = \begin{cases} gN'_o(n) & N_o(n) > gN'_o(n-1) \\ N'_o(n) & hN'_o(n-1) < N'_o(n) < gN'_o(n-1) \\ hN'_o(n) & N_o(n) < hN'_o(n-1) \end{cases} \quad (41)$$

The output of the summation step 650 defines a sequence of values Cint corresponding to the magnitude of the interference simulation signal to be injected into one or both of the receivers of an exemplary cell-site base station. As is apparent from FIG. 5, the extent of the attenuation required to be supplied by digital attenuators 270, 280 in order that the paths 190, 200 produce the required sequence of interference magnitudes $C_{int}$ is dependent upon the output power of noise generator 155, as well as upon the attenuation provided by manual attenuators 240, 250. The step, 455, of calculating the levels of attenuation to be provided to digital attenuators 270 and 280 thus requires determination of the respective powers $Z_1$ and $Z_2$ of the incident white noise. Hence, $$Z_1 = N_w - A \quad (42)$$

$$Z_2 = N_w - B \quad (43)$$

where A and B denote the attenuation (dB) provided by manual attenuators 240 and 250, and where Nw corresponds to the noise power produced by noise generator 155. It follows that the levels (in dB) of attenuation Y1 and Y2 required to be provided by digital attenuators 270 and 280 may be expressed as:

$$Y_1 = Z_1 - C_{int} \quad (44)$$

$$Y_2 = Z_2 - C_{int} \quad (45)$$

For the situation in which attenuators 270 and 280 have a resolution of approximately 0.5 dB, the attenuation levels $Y_1$ and $Y_2$ may be rounded as follows:

$$Y_1 = \frac{\text{Int}\{2*[Y_1 + 0.5]\}}{2} \quad (46)$$

$$Y_2 = \frac{\text{Int}\{2*[Y_2 + 0.5]\}}{2} \quad (47)$$

The values $Y_1$ and $Y_2$ will typically be converted to a binary format prior to being transferred to controller 300. As is indicated in FIG. 5, controller 300 is operative to adjust the digital attenuation settings of attenuators 270 and 280 through control lines 292 and 294 in accordance with the values of $Y_1$ and $Y_2$.

Figure 9:
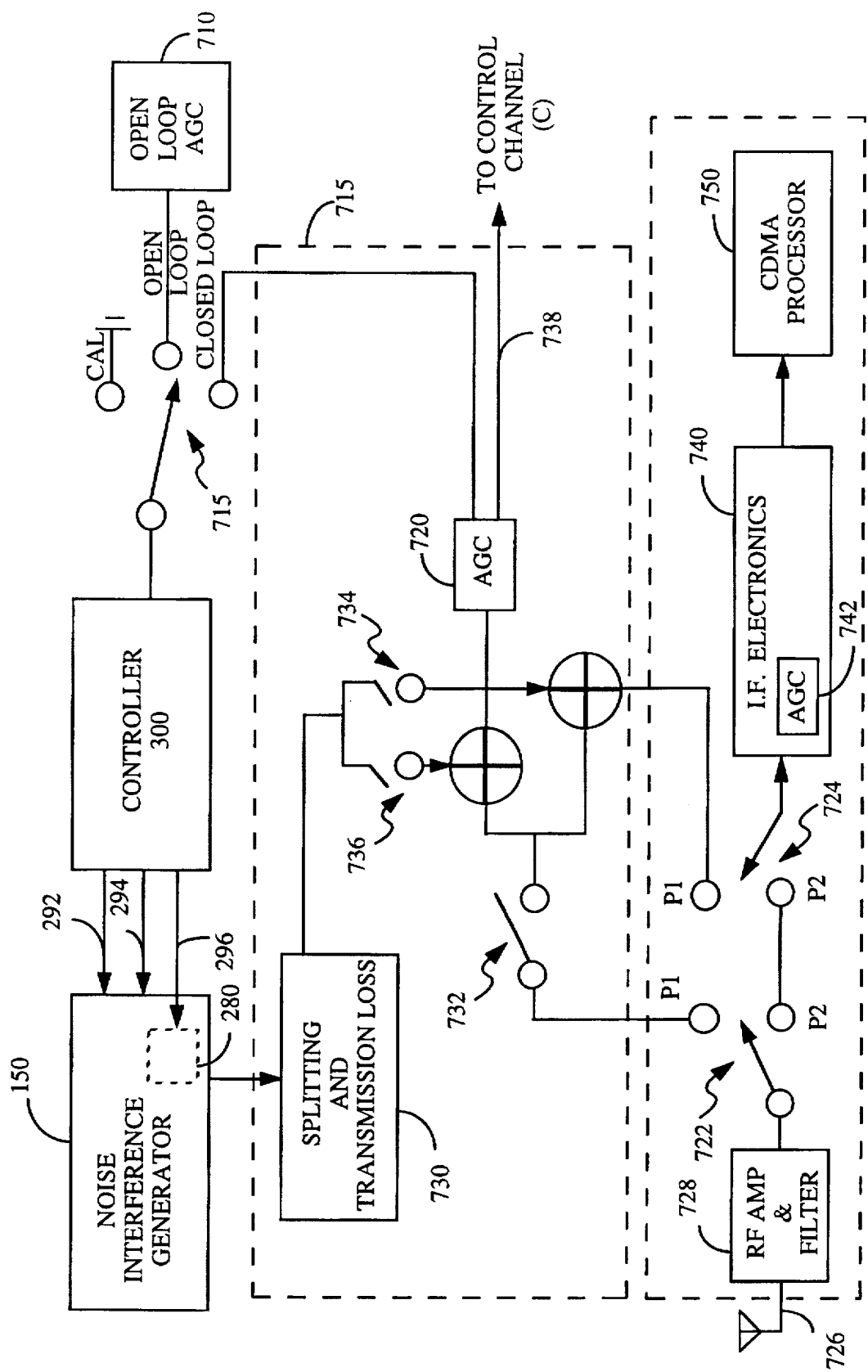
FIG. 9 shows a block diagram of a preferred integration of the noise interference generator of the invention into an exemplary cell-site receiver.
Figure 7:
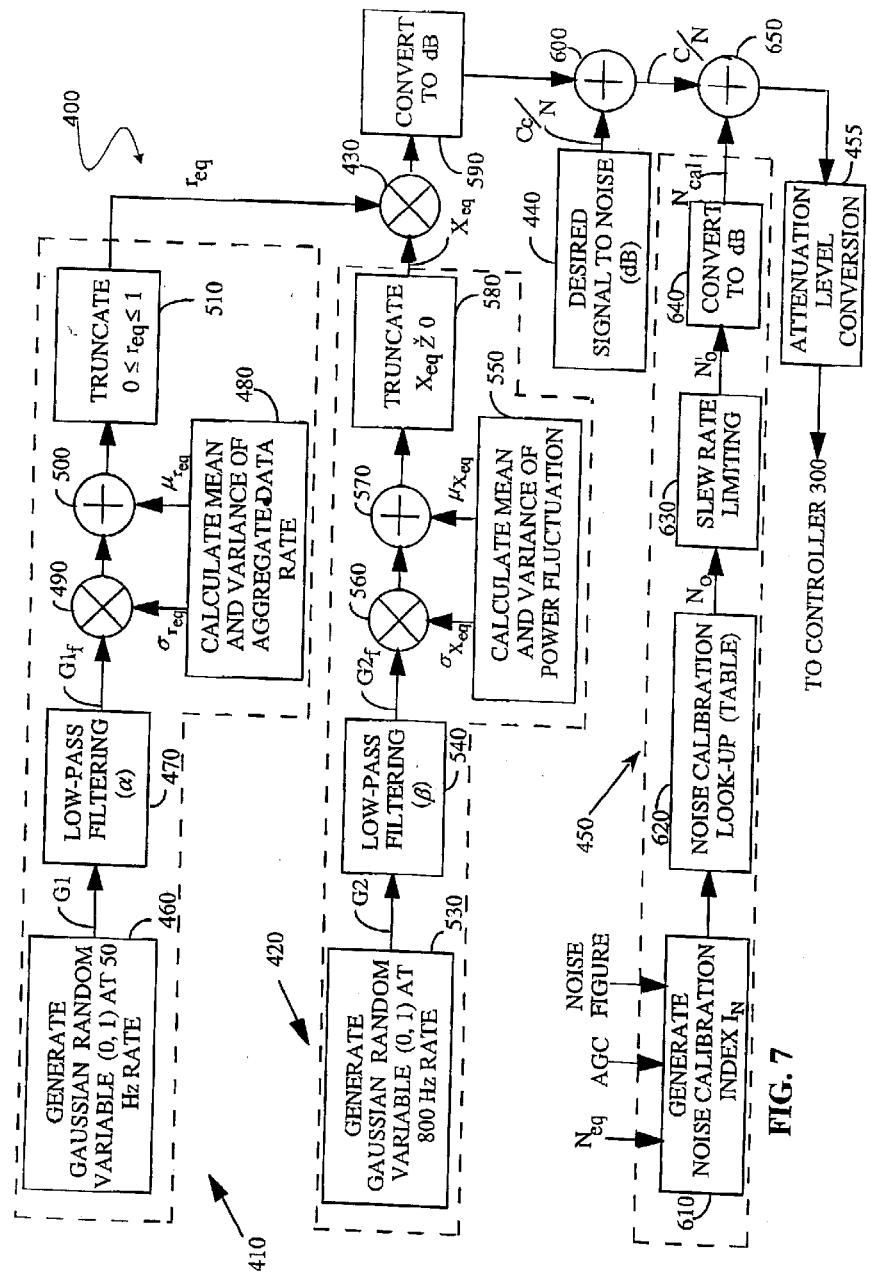

Referring now to FIG. 9, a block diagram of a preferred method and apparatus for integration of the noise interference generator 150 with the cell-site or base station receiver R1 is shown. An interface module 700 is shown which includes an automatic gain control (AGC) circuit 720 which is associated or used in conjunction with one communication channel. Here, the output of AGC circuit 720 is coupled to one contact of a switch 715 associated with an open loop AGC circuit 710, and an AGC control channel C. Specifically, a first control voltage produced by AGC circuit 720 is supplied using AGC control channel C to the look-up table of digital attenuation values compiled during system calibration.

A second control voltage is provided over a receive channel (R) where it is directed to IF electronics 740 within receiver R1. Typically, IF electronics 740 also includes a second AGC circuit 742, although a separate AGC circuit can be provided as desired. The voltage signal provided by AGC circuit 742 and IF electronics 740 is transferred to a CDMA processor 750 for conventional processing as discussed above.

The attenuation value associated with the first control voltage is retrieved from the look-up table of digital attenuation values, thus allowing an estimate to be made of the signal power received at the cell-site. Such an estimation is predicated on the inverse relationship existing between the attenuation values stored within the look-up table and the simulated received signal power generated during calibration by incrementally adjusting digital attenuators 270 and 280. The values of the digital attenuators 270 and 280 may then be adjusted in accordance with this estimation of input signal power in order to regulate the power provided to cell-site receivers R1 and R2 (FIG. 5).

As shown in FIG. 9, first cell-site receiver R1 is placed in electrical communication with noise interference generator 150 through interface module 700 using a pair of switches 722 and 724. This is accomplished by setting or closing switches 724 and 726 to a first position P1. In this position, the signal energy received at the cell-site is directed from antenna 726 to the noise interference generator after being processed by an RF amplification and filtering network 728 within receiver R1. Alternatively, switches 722 and 724 are set or closed to a second position P2 when it is desired to disengage receiver R1 from connection to interference generator 150 and prevent the input of signals from antenna 726.

Interface module 700 generally provides for or enables the use of four distinct modes of operation when switches 722 and 724 are set in first position P1. In an OFF mode, a switch 732 is closed, while switches 734 and 736 are opened and switch 715 is placed in an OPEN LOOP contact position. Accordingly, in this OFF mode of operation the switch settings are adjusted so as to prevent a noise interference signal from being injected into the IF electronics 740 of receiver R1. As a precaution, however, generally controller 300 digitally sets an attenuator 280 to a maximum attenuation level or value when operating in the OFF mode.

In a CALIBRATION mode, switch 732 is closed, while switch 715 is in a CALIBRATION (CAL) contact position, and switches 734 and 736 are each alternatively opened and closed to accomplish calibration of the signal channel corresponding to each switch. That is, each of switches 732 and 734 are opened and closed to calibrate the control channel C and receive channel R, respectively, by transferring power over these channels.

During an exemplary CALIBRATION mode sequence the attenuation provided by digital attenuator 280 is varied between 0 and 63.5 dB in increments of 0.5 dB. An attenuation block 730 included within FIG. 8 represents the attenuation experienced by the signal produced by the attenuator 280 as a consequence of power splitting and transmission losses. At each incremental level of attenuation, the control voltages produced by AGC circuit 710 as presented on channel control line or test port 738 is sampled and recorded. In this way, four calibration tables are produced (one for each channel of the two receivers) of AGC voltages indexed as a function of digital attenuation. The values of digital attenuation within these tables are used during CLOSED LOOP operation in estimating the power received by the antenna of the cell-site receiver, e.g., antenna 726 of receiver R1.

In an OPEN LOOP mode, interference induced by other subscriber units in the communication system may be simulated independent of fluctuations in the level of background interference. In the OPEN LOOP mode, switches 732 and 734 are closed, while switch 736 is opened and switch 715 is set in an OPEN LOOP position. In this mode, the signal interference power incident upon AGC circuit 720 is composed of a combination of signal power received by antenna 726 from Nr actual users within the simulated cell, and an interference signal from noise interference generator 150 corresponding to $N_{eq}$ simulated users. An OPEN LOOP AGC circuit provides an OPEN LOOP control voltage proportional to the number of $N_r$ actual users, the noise figure of the cell-site receiver, and the thermal background noise.

In a SIMULATION mode, switches 732 and 734 are closed, while switch 736 is opened, and switch 715 is placed in a CLOSED LOOP position. In the SIMULATION mode, the AGC control voltage generated by AGC circuit 710 is communicated to controller 300 through switch 715, and is used as an index value in the corresponding calibration table (compiled as described above). Based on this index value, controller 300 retrieves an estimate from the calibration table of the number of actual users $N_r$ from which the signals are received by antenna 726. This estimate is then used to determine the number $N_{eq}$ of users which need to be simulated in order that receiver R1 be operative at a desired capacity level. As was described with reference to FIG. 6, controller 300 adjusts attenuator 280 such that the requisite interference signal power is injected into the IF electronics 740 of receiver R1.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for simulating interfering signals useful for simulating interference in a communication system in which information signals are communicated over a plurality of communication channels, comprising the steps of:

establishing a first set of simulated users disposed within a first region of said communication system which comprises a desired number of users transmitting signals;

determining a first composite signal power corresponding to a sum of signal power for signals transmitted by said first set of simulated users;

determining a first normalized data rate for said signals transmitted by said first set of simulated users; and generating a first interference signal having a signal power based on said first composite signal power and first normalized data rate.

2. The method of claim 1 further comprising the steps of:

establishing a second set of simulated users disposed within a second region of said communication system which comprises a second desired number of users transmitting signals;

determining a second composite signal power corresponding to a sum of signal power for signals transmitted by said second set of simulated users;

determining a second normalized data rate for said signals transmitted by said second set of simulated users; and modifying said first interference signal in response to said second composite signal power and second normalized data rate.

3. The method of claim 1 wherein said step of generating a first interference signal comprises the steps of:

generating electrical noise over a predetermined frequency band;

forming a product between said first composite signal power and first normalized data rate; and adjusting a power level of said electrical noise in response to a value of said product.

4. The method of claim 1 wherein said step of determining a first composite signal power comprises the steps of:

determining a number real users physically present in said first region;

determining an equivalent number of users to be simulated within said first region by subtracting said number of real users from said first set of simulated users in said first set;

determining a nominal first signal power based on said equivalent number of users; and producing variations in said nominal first signal power using a random variable function.

5. The method of claim 1 wherein said step of determining a first normalized data rate comprises the step of establishing a set of data rates for said first set of simulated users.

6. The method of claim 1 wherein said step of determining a first composite signal power comprises the steps of:

representing variations in said signal power for said signals transmitted by said first set of simulated users as a Gaussian random variable; and forming a product of a nominal signal power for said first set of simulated users and said Gaussian random variable.

7. The method of claim 1 wherein said step of establishing a first set of simulated users comprises the steps of:

determining a desired overall capacity for said communication system;

determining average individual user communication traffic load or data transfer volume expected for users in said first region; and selecting an average usage load in terms of number of users supportable based on expected user communication traffic in said first region.

8. The method of claim 1 further comprising the step of transmitting at least a second interference signal which corresponds to simulated transmissions originating from regions other than said first region.

9. In a wireless communication system in which users communicate information signals between one another using at least one base station that includes a base station receiver and multiple access communication signals, a method for simulating interfering signals useful for simulating interference power received by said base station receiver, comprising the steps of:

determining a first composite signal power corresponding to a sum of signal power for signals transmitted by a predetermined first set of simulated users serviced by said first base station;

determining a first normalized data rate for said signals transmitted by said first set of simulated users; and generating a first interference signal having a signal power based on said first composite signal power and first normalized data rate.

10. The method of claim 9 further comprising the step of providing said first interference signal as an input to said base station receiver.

11. The method of claim 9 wherein said step of generating a first interference signal comprises the steps of:

generating electronic noise over a predetermined frequency band; and adjusting power of said electronic noise in accordance with the product of said first composite signal power and said first normalized data rate.

12. The method of claim 9 wherein said users communicate using code division multiple access (CDMA) spread spectrum communication signals, and said base station and users are located in a first cell within the communication system, wherein the step of determining a first composite signal power comprises the steps of:

determining an equivalent number of users to be simulated which corresponds to a difference between a predetermined total number of users in said first set and a number of real users actually present within said first cell; and determining a composite signal power by estimating a sum of signal power which is transmitted by said equivalent number of simulated users.

13. The method of claim 12 wherein the step of determining a first normalized data rate comprises the step of determining a first normalized data rate at which said signal power is transmitted by said equivalent number of simulated remote users.

14. A method of operating a wireless communication system having a plurality of cells in which remote users communicate information signals using at least one base station and code division multiple access (CDMA) spread spectrum communication signals, where one base station is located in a first cell and has a base station receiver, comprising the steps of:

monitoring the number of said users currently communicating within said first cell;

determining a level of signal interference power received by said base station receiver when a predetermined number of users are communicating within said first cell;

determining an equivalent number of simulated users corresponding to a difference between said predetermined number and said number of users currently communicating within said first cell; and providing a first interference signal to said base station receiver wherein power of said interference signal depends upon said equivalent number of simulated users.

15. The method of claim 14 wherein said step of providing a first interference signal comprises the steps of:

establishing a composite signal power by estimating a composite signal power associated with said equivalent number of simulated users; and establishing a normalized data rate of said composite signal power.

16. The method of claim 4 wherein said nominal signal power corresponds to signal power generated in response to an average simulated user voice activity factor.

17. A system for simulating interfering signals useful for simulating interference between communication channels in a communication system in which users communicate information signals with other users over a plurality of such communication channels, comprising:

means for providing an electronic noise signal;

controller means for generating a noise intensity control signal based on a determination of signal power transmitted by simulated users located within a first region of said communication system; and means for adjusting the power of said noise signal in response to said noise intensity control signal.

18. The system of claim 17 wherein said controller means further comprises means for determining a first normalized data rate at which said signal power would be transmitted by said simulated users, and said controller means is configured to additionally base said noise intensity control signal generation in part on this determination.

19. The system of claim 17 wherein said controller means comprises means for determining signal power transmitted by other simulated users located elsewhere within said communication system, and said controller means is configured to additionally base said noise intensity control signal generation in part on said signal power transmitted by said other simulated users.

20. The system of claim 19 further comprising means for transmitting a second interference signal in order to simulate transmissions made from regions other than said first region.

21. The system of claim 17 wherein said communication system comprises a wireless communication system in which remote users are located within a plurality of cells and communicate information signals to at least one base station which has a receiver and is located in a first cell, using code division multiple access (CDMA) spread spectrum communication signals.

22. The system of claim 17 wherein said means for providing electronic noise comprises means for producing noise with a relatively uniform spectral density over a predetermined bandwidth.

23. The system of claim 17 wherein said controller means is configured to generate said noise intensity control signal using random Gaussian-controlled variables generated at preselected rates.

24. The system of claim 23 wherein said controller means comprises:

first means for generating a first binary sequence corresponding to a Gaussian random variable at one preselected rate; and means for filtering said first binary sequence based on an estimated correlation time of data signals carried by said transmitted signal power.

25. The system of claim 23 wherein said controller means comprises:

second means for generating a second binary sequence corresponding to a Gaussian random variable at a second preselected rate; and means for filtering said second binary sequence based on an average power fluctuation.

26. A system for providing signals for simulating signal interference power received by a base station in a cellular communication system in which users within a plurality of cells communicate information signals between one another using at least one base station in a first cell that has a base station receiver, comprising:

means for providing an electrical noise signal;

controller means for generating a noise intensity control signal based on a determination of a first composite signal power transmitted by a first set of simulated users serviced by said base station; and means for adjusting power of said electrical noise signal in accordance with said noise intensity control signal.

27. The system of claim 26 wherein said first set of simulated users are located within said first cell.

28. The system of claim 26 further comprising:

means for determining a second composite signal power by determining a sum of signal power transmitted by a second set of simulated users serviced by other base stations;

means for determining a second normalized data rate at which said signal power is transmitted by said second set of simulated users; and means for generating a second interference signal based upon said second composite signal power and upon said second normalized data rate.

29. The system of claim 28 wherein said second set of simulated users are operating within cells other than said first cell.

30. The system of claim 26 wherein said controller means comprises a control network which generates a noise intensity control signal based on said first composite signal power and a first normalized data rate at which said signal power is transmitted, and said means for adjusting comprises a transmitter adjustment network, coupled to said noise source and control network, which adjusts said power level of said electrical noise in response to said noise intensity control signal.

31. The system of claim 30 wherein said controller means comprises an electronic processor element that determines said composite signal power.

32. The system of claim 30 wherein said controller means further comprises an electronic processor element that determines a second composite signal power which is a sum of signal power which is transmitted by a second set of simulated users not located in said first cell, and said transmitter adjustment network also operates to generate a second interference signal based on said second composite signal power and a second normalized data rate.

33. Apparatus for generating an interference signal for use in simulating signal interference between communication channels in a communication system in which information signals are communicated between users over a plurality of communication channels, comprising:

means for determining a first composite signal power corresponding to a sum of signal power for signals transmitted by a first set of a desired number of simulated users disposed within a first region of said communication system;

means for determining a first normalized data rate for said signals transmitted by said first set of simulated users; and means for generating a first interference signal with a signal power based on said first composite signal power and first normalized data rate.

34. The apparatus of claim 33 further comprising:

means for determining a second composite signal power corresponding to a sum of signal power for signals transmitted by a second set of simulated users;

means for determining a second normalized data rate for said signals transmitted by said second set of simulated users; and means for modifying said first interference signal in response to said second composite signal power and second normalized data rate.

35. The apparatus of claim 33 wherein said means for generating a first interference signal comprises:

an electrical noise source operating over a predetermined frequency band;

means for forming a product between said first composite signal power and first normalized data rate; and means for adjusting the power level of said electrical noise in response to a value of said product.

36. The apparatus of claim 33 wherein said means for determining a first composite signal power comprises:

means for determining a number of real users deployed in said first region;

means for determining an equivalent number of users to be simulated within said first region by subtracting said number of real users from said first set of simulated users in said first set;

means for determining a nominal first signal power based on said equivalent number of users; and means for producing variations in said nominal first signal power using a random variable function.

37. Apparatus for generating an interference signal for use in simulating signal interference between communication channels in a communication system in which information signals are communicated between users over a plurality of communication channels, comprising:

a power selector which outputs a first composite signal power corresponding to a sum of signal power for signals transmitted by a first set of a desired number of simulated users disposed within said communication system;

a data rate generator configured to output a first normalized data rate for said signals transmitted by said first set of simulated users; and a first interference signal generator coupled to said power selector and said data rate generator which produces a signal with a signal power based on said first composite signal power and first normalized data rate.

38. The apparatus of claim 37 wherein said first interference signal generator comprises:

at least one electrical noise signal generator having an output power intensity that is adjustable in response to a control signal input; and at least one noise intensity controller having a control signal output coupled to the control input of said noise source generator and inputs coupled to said power selector and data rate generator, with said control signal having a value that varies in response to changes in said signal power and data rate for simulated users.

39. The apparatus of claim 38 further comprising at least a second power selector which outputs a second composite signal power corresponding to a sum of signal power for signals transmitted by a second set of a desired number of simulated users disposed within said communication system, and said noise intensity controller is configured to also receive input from said second power selector and base signal generation in part on said signal power which is transmitted by said other simulated users.

40. The apparatus of claim 39 wherein said second set of users are located in a region different from said first set of users.

41. The apparatus of claim 37 wherein said communication system is a cellular communication system in which users within a plurality of cells communicate information signals between one another using at least one base station included in a first of said cells and having a base station receiver.

42. The apparatus of claim 37 wherein said communication system comprises a wireless telephone/data communication system in which remote users are located within a plurality of cells and communicate information signals to at least one base station which has a receiver and is located in a first cell, using code division multiple access (CDMA) spread spectrum communication signals.

43. The apparatus of claim 37 wherein said power and signal rate are generated using random Gaussian-controlled variables generated at preselected rates.

44. The apparatus of claim 38 wherein said noise intensity controller comprises:

first binary sequence generator producing a Gaussian random variable at one preselected rate; and first sequence filter connected to receive and filter said first binary sequence based on an estimated correlation time of data signals carried by said transmitted signal power.

45. The apparatus of claim 38 wherein said noise intensity controller comprises:

second binary sequence generator producing a Gaussian random variable at a second preselected rate; and second sequence filter connected to receive and filter said second binary sequence based on an average power fluctuation.

46. The method of claim 1 further comprising transferring said interference signal into said communication system.

47. The system of claim 17 further comprising means for transmitting said electronic noise signal after being adjusted to said communication system.

48. The system of claim 26 further comprising means for providing said electronic noise signal as an input to said base station receiver.

49. The apparatus of claim 33 further comprising means for transmitting said interference signal on channels in said communication system.

50. The apparatus of claim 37 further comprising means for transmitting said interference signal on channels in said communication system.

* * * * *

UNITED STATES PATENT AND TRADEMARK OFFICE
CERTIFICATE OF CORRECTION

PATENT NO.    : 5,675,581
DATED         : October 7, 1997
INVENTOR(S)   : Samir S. Soliman It is certified that error appears in the above-identified patent and that said Letters Patent is hereby corrected as shown below:

Drawings,
Delete Sheet 7 consisting of Fig. 7 and replace with attached Sheet 7 consisting of Fig. 7.

Signed and Sealed this

Twelfth Day of August, 2003

JAMES E. ROGAN
*Director of the United States Patent and Trademark Office*